United States Patent [19]

Desourdis

[11] 3,893,181

[45] July 1, 1975

[54] THIN BASE SELF-TRACKING RECORDING TAPE

[76] Inventor: Robert I. Desourdis, 15420 S.W. 84th Ct., Miami, Fla. 33157

[22] Filed: Feb. 14, 1973

[21] Appl. No.: 332,288

[52] U.S. Cl. ........................ 360/84; 360/1; 360/122; 360/134; 360/130

[51] Int. Cl. ............................................ G11b 5/62

[58] Field of Search ..................... 274/41.4, 43, 4 J; 179/100.2 T, 100.2 MD; 352/237, 37; 360/1, 84, 122, 134, 130

[56] References Cited

UNITED STATES PATENTS

| | | | |
|---|---|---|---|
| 2,245,286 | 6/1941 | Marzocchi | 179/100.2 T |
| 3,047,844 | 7/1962 | Armstrong | 242/55.17 |

FOREIGN PATENTS OR APPLICATIONS

| | | | |
|---|---|---|---|
| 909,742 | 10/1962 | United Kingdom | 274/41.4 |
| 647,211 | 6/1937 | Germany | 352/37 |
| 401,910 | 2/1943 | Italy | 274/43 |

*Primary Examiner*—Harry N. Haroian
*Attorney, Agent, or Firm*—Witherspoon and Lane

[57] ABSTRACT

A self-tracking recording tape is disclosed. The invention is primarily directed to thin base magnetic recording tape. However, the concepts of this invention are equally applicable to other recording tapes or film. Instead of a flat base tape, the tape of this invention is corrugated to form a plurality of V-shaped tracks across the width of the tape. The tape reels, the transport mechanisms, and the playback-reproduce heads utilized with the tape of this invention are all designed to accommodate the V-shaped grooves in the tape. In this manner, the tape becomes essentially self-tracking. That is, no auxiliary or additional guide means such as the edge guides normally used with magnetic tape recorders, are required to properly guide the tape across the head. In addition to the self-tracking feature, tapes designed in accordance with this invention can accommodate a large number of tracks across a given width of tape.

4 Claims, 12 Drawing Figures

THIN BASE SELF-TRACKING RECORDING TAPE

BACKGROUND OF THE INVENTION

This invention relates to recording tape or film; and more particularly to self-tracking recording tape or film.

The recording industry, particularly the magnetic tape recording industry, has in relatively recent years become a large and continually expanding industry. Available on today's market are magnetic recording tape systems ranging from complex systems utilized in computers or with other industrial or business applications down to relatively simple systems utilized for home entertainment or other purposes. Since the first magnetic tape system appeared on the market, the industry has continually improved the systems. For example, better tapes have been produced, better heads and better head shields have been designed, and the transport systems have been vastly improved. In addition, tremendous strides have been made in reducing the size, weight and cost of these magnetic recording systems. In more recent times, the industry has been striving to increase the number of tracks that can be provided on a given tape width. As the packing density on a given tape is increased, the need for more accurate alignment of the tracks with respect to the head also increases. Without this accurate alignment, cross talk and distortion will occur.

Many of today's magnetic tape recording systems utilize an edge guide to align the tape properly with respect to the head. Today's magnetic tapes are extremely thin; therefore, a very small surface of the tape is used to guide the tape in these edge guide systems. Further, the edge of the tape becomes worn from rubbing against the edge guide; and therefore, the edge of the tape becomes increasingly less reliable as a guide. After repeated usage of the tape, the edge of the tape may become so worn that the tape will no longer be accurately aligned with respect to the head or heads. This is particularly true where a large number of tracks are provided on a given tape. When the tracks are no longer properly aligned with the head gap or head gaps, distortion occurs. In addition to the wear problem, the edge guide alignment systems are limited in the degree of accuracy of alignment that such a guide system can provide since a very small portion of the tape is actually used for guide purposes.

As has been mentioned above, the problem of providing accurate tracking increases as the packing density increases since a higher degree of accuracy is required when a large number of tracks are provided on a given width of tape. However, accurate tracking is also required when there are but a few tracks on a given tape width since improper tracking, even in this instance, will cause distortion or possibly cross talk. While the above discussion has been directed to magnetic tapes and magnetic tape recording systems, accurate tracking is required in any tape or film recording system. Thus, this problem of providing accurate tracking is not one that is exclusively related with magnetic tape recording systems and tape.

This invention provides a recording tape or film that is essentially self-tracking. In addition to the tape itself, this invention is directed to specifically designed tape reels, tape transport systems, and record-reproduce heads or transducers that are designed to accommodate the tape or film. With the tape or film, reels, transport mechanisms and heads designed in accordance with this invention, a high degree of tracking accuracy can be obtained; therefore, a large number of recording tracks can be provided on a given width of tape or film.

SUMMARY OF THE INVENTION

In accordance with this invention, thin-base tapes or film are corrugated to form a number of essentially V-shaped tracks. In the conventional audio tapes or films, these tracks are formed along the length of the tape or film. In the higher speed tape systems, such as video tape recorders, the V-shaped tracks are formed across the width of the tape. The hub of the tape or film reel has a like number of V-shaped grooves to accommodate the first turn of the tape or film. The succeeding turns of the tape or film will then lock into the grooves of the just prior turn. Any rollers or guides of the recording transport system also contain V-grooves to accommodate V-shaped tracks of the tape or film. Similarly, where the tape or film is guided across a record-reproduce head or heads, the head or heads are also shaped to accommodate the V-tracks in the tape or film.

It is therefore an object of this invention to provide a self-tracking recording-playback system.

It is another object of this invention to provide a self-tracking recording tape.

It is still another object of this invention to provide a self-tracking recording film.

It is a further object of this invention to provide a recording-playback system specifically designed to accommodate the self-tracking tape and film of this invention.

It is still a further object of this invention to provide a recording tape or film having a large number of tracks per given width of tape or film.

BRIEF DESCRIPTION OF THE DRAWING

The above mentioned and other objects of this invention will become readily apparent from the following detailed description of the invention when read in conjunction with the annexed drawing in which.

DESCRIPTION OF THE INVENTION

Figure 1:
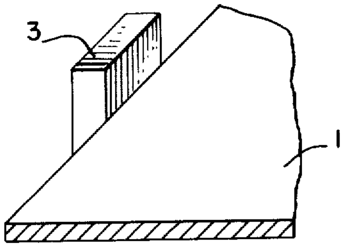
FIG. 1. (PRIOR ART)
FIG. 1 shows a conventional edge-guided magnetic recording tape.

FIG. 1 shows a conventional, prior art, thin base magnetic recording tape 1. Tapes such as tape 1 generally consist of a polyester substrate coated on one side with a ferrous oxide. These tapes are generally approximately one mil thick. However, tapes, such as tape 1, are available on the market in various widths ranging from 1/16 inch to 2½ inches. In addition to tapes coated with oxide on one side, tapes with an oxide coating on both sides of the base are also available on the market. Of course, the double-sided tapes must be sufficiently thick to prevent magnetization through the tape. These flat, thin tapes are readily available in the market and are the type of tape used almost exclusively in present day magnetic tape recording systems.

In use, a tape such as tape 1 is guided across a magnetic record-reproduce head or heads. The head or heads, during the record cycle, form recording tracks on the tape. During the playback cycle, the tape is again transported across the head or heads and the head or heads read the information stored on the recording tracks. Obviously, during the reproduce or read cycle the heads will not properly read the information stored on the tape unless the recording tracks all are properly aligned with the head or heads. In many of the present day recording systems, an edge guide, such as the guide 3 in FIG. 1, is used to properly guide the tape past the head. As is apparent from FIG. 1, guidance is provided by merely running the edge of the tape along the surface of the guide. In order to reduce friction and wear, the surface of guide 3 upon which the edge of the tape rubs must be highly polished and of course the edge of the tape must also offer little frictional resistance. Since tapes, such as tape 1, are extremely thin, it is obvious that the very little surface of the tape is utilized to guide the tape properly across the head or heads. It should also be obvious that any wear or fraying of the edge of the tape, which will occur after repeated uses of a given tape, will result in improper guidance of the tape across the head and may result in distortion. As the number of tracks provided on a given width of tape increases, the degree of tracking accuracy that must be provided by the guidance system increases since the tracks are spaced closer together. A guidance system such as edge guide 3 of FIG. 1 can only provide a certain degree of tracking accuracy, and this accuracy will generally decrease after repeated uses of the tape due to edge wear.

Figure 2:
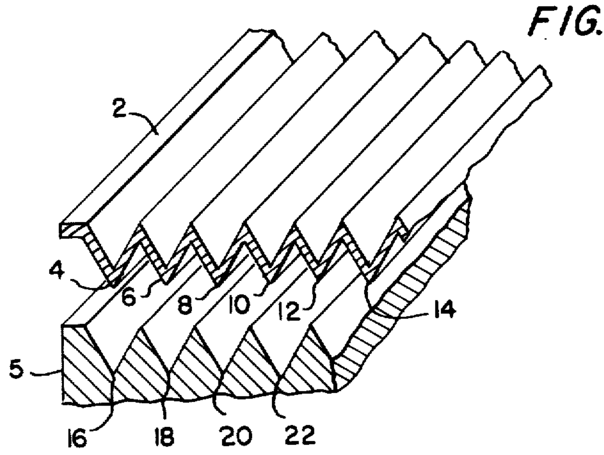
FIGS. 2 through 5 show thin base magnetic recording tapes designed in accordance with this invention.

FIG. 2 shows a thin magnetic self-tracking tape 2 designed in accordance with this invention. Tape 2 is made from a polyester substrate having an oxide coated on at least one side thereof. Tape 2 is corrugated to form the individual V-grooves 4, 6, 8, 10, 12 and 14. In effect, as is shown in FIG. 2, tape 2 is formed into a series of miniature V-belts. The number of such V-belts formed in a given width of tape is optional with the manufacturer; however, as many as fifty or more such V-belts could readily be formed in a tape ½ inch wide. In any wider tape, more such V-belts could, of course, be formed. As was the case in FIG. 1, the thickness of tape 2 is approximately 1 mil. The recording system with which tape 2 would be used can and would normally have a surface guide such as guide 5 of FIG. 2. Guide 5 has formed therein a plurality of V-grooves or notches such as the grooves, 16, 18, 20, and 22 to accommodate the V-belts or V-grooves in tape 2. Of course, the number of grooves formed in guide 5 would be equal to the number of grooves or V-belts formed in tape 2.

Figure 3:
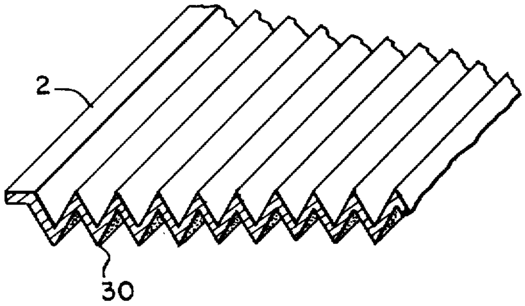
Figure 4:
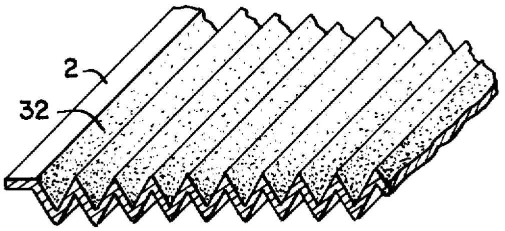
Figure 5:
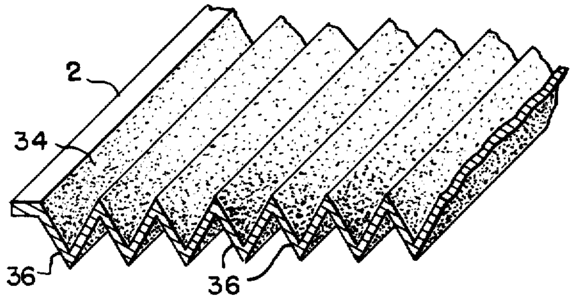

Tape 2 can have the oxide coating applied on either side or both sides of its substrate as indicated in FIGS. 3 through 5. In FIG. 3, an oxide coating 30 is applied to but one side of tape 2; and in FIG. 4, an oxide coating 32 is applied to only the opposite side of tape 2. In FIG. 5, however, an oxide coating 34 is applied to one side of tape 2 and an oxide coating 36 is applied to the other side of tape 2. Thus, in FIGS. 3 and 4 oxide coatings are applied to only one side of tape 2 whereas in FIG. 5, tape 2 has an oxide coating on each side thereof. In practice, tape 2 could first be formed as a flat tape such as tape 1 in FIG. 1. That is, the substrate would be coated with the oxide coating on either one or both sides of the substrate to form a flat tape such as tape 1. The tape would then be corrugated by heat and pressure to form the V-groove as shown in FIGS. 2 thru 5. In mass production, however, due to heat sensitive oxide binders it may prove most practical to form the substrate into self-tracking configuration prior to coating; then, adapt coating practices and machinery to the new corrugated substrate form. In normal practice, tape 2 would first be formed as a flat tape such as tape 1 in FIG. 1. That is, the substrate would be coated with the oxide coating on either one or both sides of the substrate to form a flat tape such as tape 1. The tape would then be corrugated to form the V-groove as shown in FIGS. 2 through 5.

Figure 7:
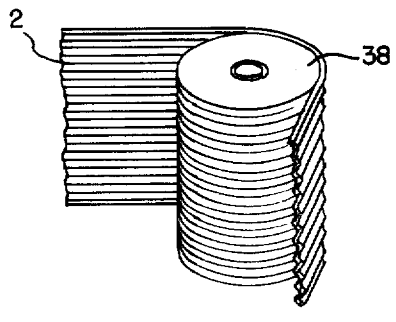
FIG. 7 shows a transport guide roller designed in accordance with this invention.

As has been mentioned above, the recording system or mechanism with which tape 2 is used would include a surface guide such as guide 5 shown in FIG. 2. This guide would have V-grooves identical to the V-grooves in tape 2. Thus, tape 2 would firmly ride in the grooves of the surface guide. Under such conditions, it is obvious that almost the entire surface of the tape is used to guide the tape rather than just the edge, as is the case in FIG. 1. With this substantially larger amount of surface of the tape being used for guiding purposes, a higher guiding accuracy or tracking accuracy is imparted to the tape. In addition to guide surface 5, the record-playback system with which tape 2 would be utilized would normally include a grooved guide roller such as guide roll 38 of FIG. 7.

Figure 8:
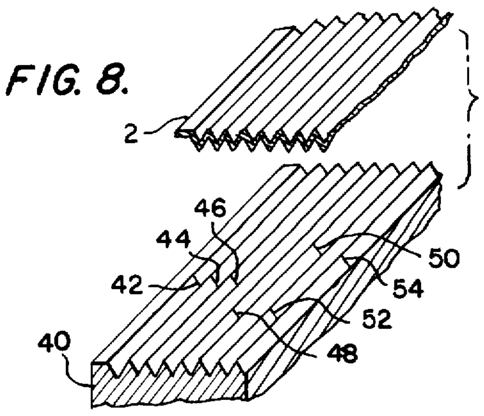
FIG. 8 shows a multiple record-reproduce head system designed in accordance with this invention.
Figure 9:
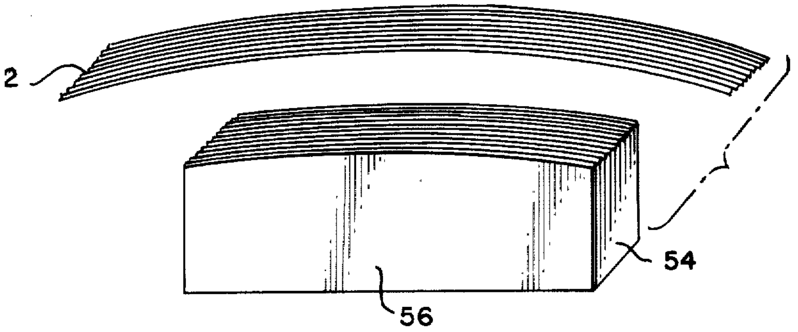
FIG. 9 shows another multiple head system designed in accordance with this invention.

Record-reproduce head systems suitable for use with tape 2 are shown in FIGS. 8 and 9. Referring to FIG. 8, this figure shows a head system 40 consisting of a plurality of individual heads. Each head, of course, has its associated gap. In FIG. 8 the gaps are indicated at 42, 44, 46, 48, 50, 52 and 54. Note that in FIG. 8, gaps 42, 44 and 46 are in line and gaps 48, 50, 52 and 54 are staggered. This in line and staggered gap arrangement is shown to merely indicate that any type of head gap arrangement can be utilized. That is, the heads can all be in line or staggered. Staggered and in line gap arrangements on multiple heads are, of course, conventional in the art. The important feature of head assembly 40 in FIG. 8 is the manner in which the head assembly is fabricated. As shown in FIG. 8, head assembly 40 consists of a plurality of individual heads so designed that the overall head arrangement has a plurality of V-shaped grooves. The V-shaped grooves of tape 2 will ride in the V-shaped grooves of head assembly 40. Multiple head arrangements such as multiple head 40 are, of course, conventional in the art; however, these heads are normally flat and do not contain the V-shaped grooves of head assembly 40.

In FIG. 8, the head assembly 40 is shown as being relatively flat. FIG. 9 shows a similar head arrangement 54 which also consists of a plurality of individual heads. In this case, all the gaps 56 are in line as shown. However, here again the gap arrangement can be in line or staggered. The electronics of the record-reproduce system will, of course, be designed to accommodate whatever particular gap arrangement is utilized. Head assembly 54, as is shown in FIG. 9, also contains a plurality of V-shaped grooves equal in number to the number of heads. Again, the grooves of tape 2 will ride in the grooves of head assembly 54. Head assembly 54 is shown as having a slight crown along its length. That is, the head assembly is slightly curved along its length. This slight curve helps maintain transport tension along the tape while the tape is passing across the head assembly.

Figure 6:
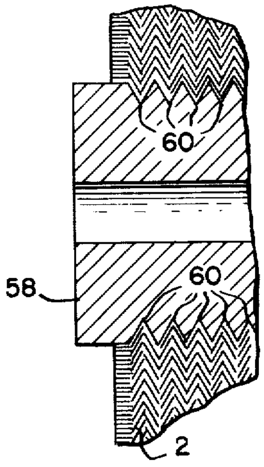
FIG. 6 shows the hub of a tape or film storage reel designed in accordance with this invention.

After a magnetic tape is produced, it is commonly wound on a reel or placed in a cassette. In the conventional reel, the hub of the reel is a smooth surface. FIG. 6 shows the hub 58 of a tape reel designed to accommodate the grooves of tape 2. Hub 58 contains a plurality of V-shaped grooves 60. The number of V-shaped grooves 60 provided in hub 58 will, of course, be equal in number to the number of V-shaped grooves in tape 2. Note, that after the first turn of tape 2 is placed on hub 58 the remaining layers or turns interlock in the grooves of the preceding turn to hold the tape 2 in place. This interlocking arrangement helps to hold tape 2 on the reel. In fact, tape 2 could actually be wound on a flangeless reel since the interlocking feature would tend to hold the tape on the reel. However, in most circumstances a conventional reel with flanges, but with grooves machined in the hub would be normally utilized to prevent accidental movement of the tape on the reel.

FIGS. 1 through 9 relate to magnetic tape and tape recording systems using longitudinal tracks. That is, tracks that run the length of the tape. From the foregoing discussion, it should be apparent that by providing the formed tape having V-shaped configurations such as tape 2, along with guiding and head apparatus designed to accommodate this configuration, a high degree of tracking accuracy can be obtained. In fact, the tape is, in effect, self-tracking. The entire surface of the tape is, in effect, self-tracking. The entire surface of the tape is used for tracking purposes; therefore, highly accurate tracking will be maintained even after repeated usage of the tape. With this high degree of tracking accuracy, a large number of tracks can be provided across the width of a given tape. Each one of the V-shaped grooves represents a track in the tape. Due to the design of the tape, head assembly, and transport mechanism, true tracking should always be maintained.

Figure 10:
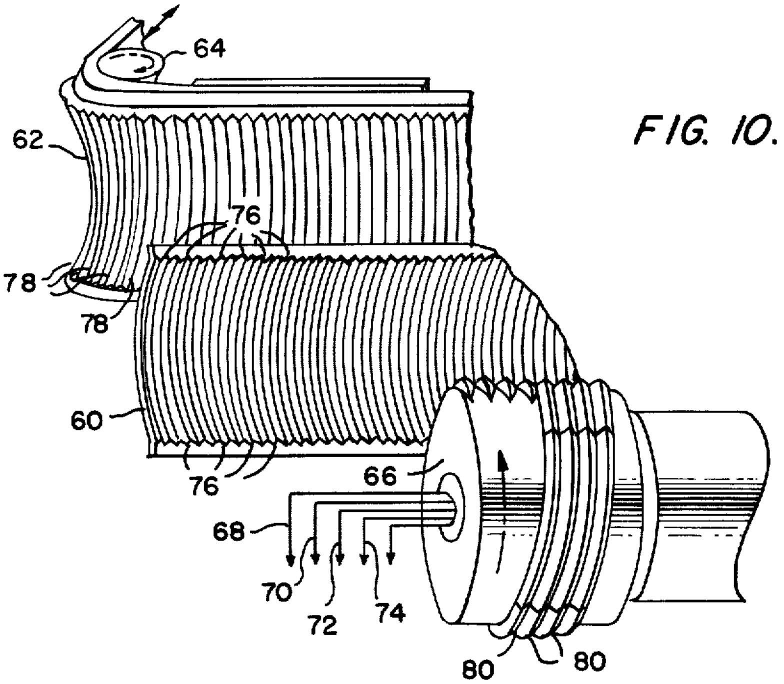
FIG. 10 shows a magnetic tape designed in accordance with this invention for video recording and shows a portion of the transport system and the head system designed in accordance with this invention to accommodate the video tape.

While the concepts of this invention are particularly adaptable to magnetic tapes having longitudinal tracks as described above, the concepts can also be applied to a video magnetic tape recording system using transverse tracks, as shown in FIG. 10.

FIG. 10 shows a magnetic video recording tape 60 having a plurality of transverse, closely spaced, V-shaped grooves 76. Except for V-shaped grooves 76, tape 60 is a conventional magnetic tape consisting of a plastic substrate having an oxide coating on one or both sides thereof. In order to transport the tape through the video recording system, a shaped belt support 62 is also provided. Belt 62 contains a plurality of grooves identical to the V-shaped grooves 76. Thus, tape 60 will ride against or in the grooves 78 of belt 62. The V-shaped grooves 78 will, of course, be equally spaced with the V-shaped grooves 76. Belt 62 is conventionally driven by a series of rollers or the like, such as roller 64. The head assembly 66 is specifically designed to be used with tape 60. Head 66 has four individual heads and contains a plurality of V-shaped grooves 80. The V-shaped grooves 80 are so formed in head assembly 66 that the head operates as a screw to also drive tape 60. Since head assembly 66 contains four heads or four channels, the four electrical leads 68, 70, 72 and 74 are shown as being brought out through the hub of head assembly 66. Thus, tape 60 is similar to tape 2 of FIGS. 2 through 9, but has V-shaped grooves running across the tape instead of along the tape. Further, the transport and head assemblies are specifically designed to accommodate these transverse V-shaped grooves.

Figure 11:
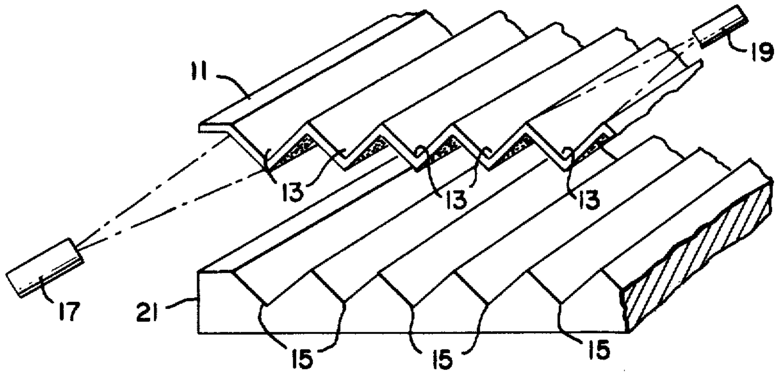
FIG. 11 shows a thin base tape or film designed in accordance with this invention for use in optical record-reproduce system.
Figure 12:
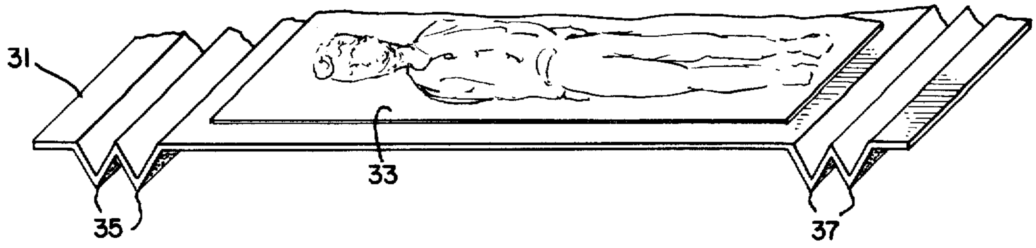
FIG. 12 shows a thin base photographic recording tape or film utilizing the concepts of this invention.

The foregoing discussion of the invention has been directly related to magnetic tape recording systems. As has been mentioned, the concepts of this invention can also be applied to other recording tapes or film. This is illustrated in FIGS. 11 and 12. FIG. 11 shows a recording tape or film 11 having a plurality of closely spaced, V-shaped grooves 13. Tape or film 11 will consist of a suitable substrate coated with appropriate sensitive material on one or both sides thereof. Tape or film 11 will be guided through the recording-playback system by means of the surface guide 21. Again, surface guide 21 has a plurality of V-shaped grooves 15 equal in number to V-shaped grooves 13 and preferably identical in size and shape to V-shaped grooves 13. Information is stored on or read from tape or film 11 by means of the transducers 17 and 19. For example, the system could be an electron beam or laser beam recording system.

FIG. 12 shows the concepts of this invention applied to a thin base photographic recording tape or film. The photographic tape or film 31 would typically have a photographic image 33 in the central portion thereof and V-shaped grooves 35 on one side of photographic image 33 and V-shaped grooves 37 on the other side of photographic image 33. V-shaped grooves 35, for example, could be the magnetic audio tracks, and V-shaped grooves 37 could be the magnetic speed control tracks. These could also, of course, be optical rather than magnetic tracks. The system with which tape 31 would be utilized would, of course, have to have proper transport and then record-reproduce systems to accommodate the V-shaped grooves. Typically, these mechanisms would also include V-shaped guides and the like.

From the foregoing description it should be apparent that this invention provides a recording tape or film that is effectively self-tracking. Further, due to the self-tracking feature of the tape, a large number of tracks can be provided across a given width of tape. In addition to the tape or film itself, suitable transport mechanism, head assemblies and storage assemblies for the self-tracking tape are also disclosed.

While the invention has been disclosed with reference to specific embodiments, it will be apparent to those skilled in the art that various changes and modifications can be made to the specific embodiments without departing from the spirit and scope of the invention as set forth in the appended claims.

What is claimed is:

1. A record-reproduce system comprising:

a thin accordion pleated recording tape having a sensitive coating on at least one side thereof, said accordion pleats being so formed in said tape that said tape has a plurality of substantially V-shaped grooves formed on each side thereof, said substantially V-shaped grooves on one side of said tape being separated from each other by the substantially V-shaped projections formed by said substantially V-shaped grooves on the other side of said tape;

a guide mechanism having a plurality of substantially V-shaped grooves for accommodating said substantially V-shaped projections, said substantially V-shaped projections on the side of said tape adjacent said guide mechanism mating with said substantially V-shaped grooves in said guide mechanism;

at least one guide roller having a plurality of substantially V-shaped grooves formed in its surface for mating with said substantially V-shaped projections on the side of said tape adjacent said guide roller; and a head assembly having a plurality of heads so formed that said head assembly has a plurality of substantially V-shaped projections for mating with said substantially V-shaped grooves of the side of said tape adjacent said head assembly.

2. A recording-reproducing system as described in claim 1 wherein said substantially V-shaped grooves in said tape are formed along the length of said tape.

3. A recording-reproducing system as described in claim 1 wherein said substantially V-shaped grooves are formed across the width of said tape.

4. A recording-reproducing system as described in claim 3 wherein said grooves in said head assembly are so arranged as to form a screw thread arrangement.

* * * * *